Figure 1:
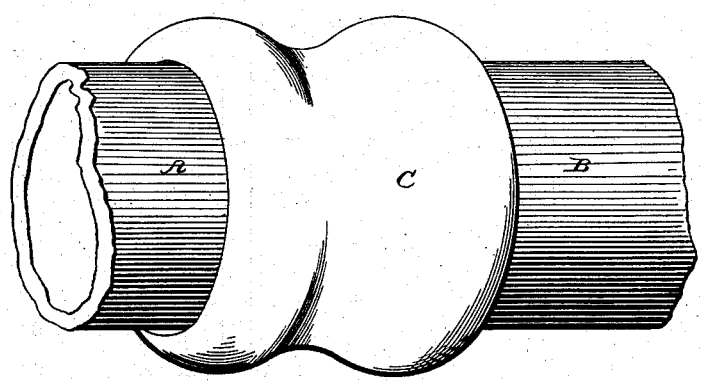

(No Model.)

G. RUSSELL & R. W. GORDON.
PIPE COUPLING.

No. 284,146. Patented Aug. 28, 1883.

WITNESSES:
Fred. G. Dieterich.
Jno. W. Stockett.

INVENTORS.
Geo. Russell.
Robert W. Gordon
by A. C. Johnston,
ATTORNEY.

UNITED STATES PATENT OFFICE.

GEORGE RUSSELL AND ROBERT W. GORDON, OF McKEESPORT, ASSIGNORS TO EDMUND C. CONVERSE, OF PITTSBURG, PENNSYLVANIA.

PIPE-COUPLING.

SPECIFICATION forming part of Letters Patent No. 284,146, dated August 28, 1883.

Application filed October 3, 1882. (No model.)

*To all whom it may concern:*

Be it known that we, GEORGE RUSSELL and ROBERT W. GORDON, of McKeesport, in the county of Allegheny and State of Pennsylvania, have invented certain new and useful Improvements in Pipe-Couplings; and we do hereby declare the following to be a full, clear, and exact description thereof, reference being had to the accompanying drawings, and to the letters of reference marked thereon.

Our invention relates to certain improvements in couplings for light-metal tubing, and has special reference to certain improvements in the coupling for such tubing patented September 5, 1882, by Edmund C. Converse. In that patent there is shown this light-metal tubing, having one or more lugs or similar connecting devices, and the coupling sleeve or collar having annular calking-recesses at each end, and locking seats or recesses below the mouths of the calking-recesses, in which the lugs on the tubing engage, so that after the pipe is so connected with the collar the calking-recesses are filled with lead or other suitable calking material, and the lugs are thus held within the locking-recesses by the calking material, and a secure joint for the light-metal tubing thus formed without cutting into or weakening the tubing.

The object of our invention is to so improve this coupling that the lugs on the tubing can enter their locking-seats more easily, and that the end of the pipe or tubing will be pressed against the central ring of the coupling-collar, or against the end of the pipe inserted at the other side of the coupling-collar, and thus form a more secure and smooth joint for the tubing.

It consists, essentially, in combining with pipe or tubing having one or more lugs at or near the end thereof a coupling-collar having an annular calking-recess at each end thereof, and one or more ribs extending diagonally across each calking-recess, thus forming an inclined locking-seat, with which the lug or lugs on the tubing engage, and upon the turning of the pipe or collar pass up the inclined seat and press the end of the tubing against the end of the tubing secured in the opposite end of the coupling-collar, or against the central ring in the coupling-collar, the lugs being locked within the coupling-collar by the calking material, and the ends of the pipe being pressed, by means of inclined seats, securely against each other, or against the central ring of the collar, and thus forming a coupling wherein the inner surface of the tubing is smooth and the meeting of the ends of the pipe against each other or the central ring is secured.

To enable others skilled in the art to which our invention relates to make and use the same, we will proceed to describe its construction and manner of use, referring to the accompanying drawings, forming part of this specification, in which—

Figure 2:
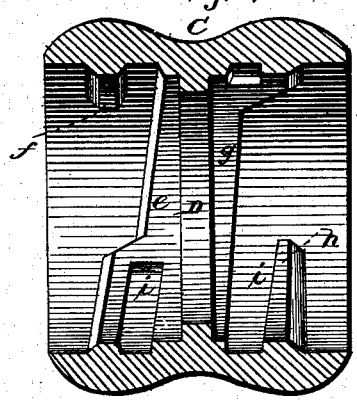
Figure 3:
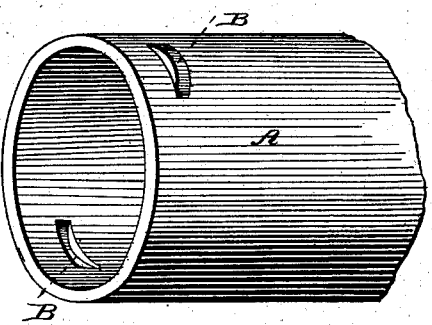
Figure 4:
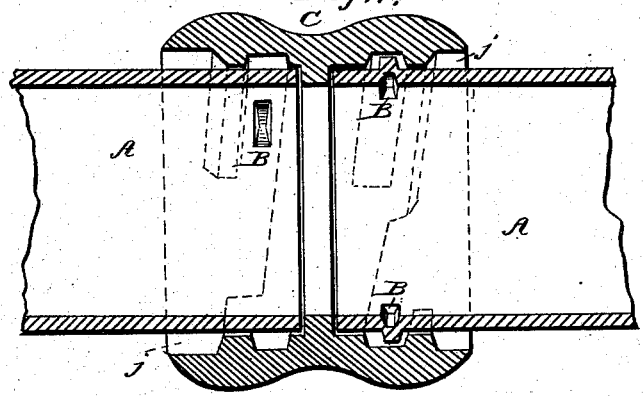

Figure 1 is a perspective view of two sections of pipe secured in the coupling by means of our improved joint or collar. Fig. 2 is a vertical section of the coupling-collar. Fig. 3 is a perspective view of a section of a pipe, showing the projections formed thereon; and Fig. 4 is a vertical longitudinal section of two sections of the pipe in the coupling.

In the accompanying drawings, A A represent sections of pipe, each of which are arranged in juxtaposition with a coupling, and have two projections, B, at or near the ends of the pipe or tubing. The projections are shown as being formed by forcing or expanding outward a portion of the metal of the pipe by means of suitable tools, or by machinery constructed for the purpose, and the projections are shown arranged at an obtuse angle to the axis of the pipe or tubing.

The coupling-collar C is preferably formed by casting, its construction being particularly indicated in Figs. 1 and 2. It is preferably formed with an annular inwardly-projecting flange, D, at or about the center thereof, against which the ends of the pipe or tubing butt or bear, the central ring or flange extending out, so that its face is even with the interior face of the tubing which meet on either side of it, thus forming a smooth interior to the joint at the coupling. On either side of this annular central ring is the inner face of the coupling-collar, (marked in the drawings *e* on one side of the central ring and *g* on the other of said ring,) these inner faces being of such size as to fit neatly around the outer surface of the pipe or tubing. Beyond these inner faces are the annular calking-recesses *j*, for the reception of lead or any suitable calking or packing material, and extending across each calking-recess are one or more ribs, (marked f in one calking-recess and h in the opposite calking-recess,) the ribs extending diagonally across the calking-recesses and forming the inclined seats i for the reception of the lugs on the pipe or tubing. These ribs f and h extend out, so as to meet or bear against the exterior of the pipe, and thus to form supports for holding the pipe concentric to the bore of the coupling, whereby a uniform packing-space is formed around the pipe in the calking-recesses. j. In practical use we prefer to employ two of these locking-ribs within each calking-recess, and a corresponding number of lugs on the tubing; but where the collar is employed with large tubing the number of ribs and projections may of course be correspondingly increased. We also prefer to employ with our coupling-collar the annular central ring or flange, D; but this flange may be dispensed with, if desired, as the ribs and inner faces of the collar will hold the tubing concentric, and the lugs on the tubing, passing back of the ribs, will hold the tubing in proper position longitudinally of the coupling, and by means of the inclined seats i the ends of the two sections of tubing will be butted or forced against each other, thus forming a smooth interior at the joint, which is desired.

As the faces of the locking-ribs nearest the mouths of the coupling are on an incline, or extend diagonally across the locking-recesses, and a large space is formed for the entrance of the lugs on the tubing into their locking-seats, we are enabled to enter the locking-lugs into the coupling more easily than in the Converse patent, above referred to, it being necessary in said patent that the lugs be presented exactly to the space between the locking-seats, whereas in our coupling this is not necessary, as the pipe can be passed within the coupling-collar and turned until the lug passes into this locking-seat, the lugs sliding along the outer surface of the rib until they pass down into the seats i, and then catching on the inner face of these ribs, forming the seats, and being pressed or forced thereby against the central ring or the tubing in the opposite end of the collar. After the tubing is thus secured in the collar all that is necessary is to pour or pack the calking material, when the joint is made.

By our invention we form a coupling wherein the pipe is easily connected, and by which the ends thereof are forced or pressed securely together or against the central ring, thus preventing any leakage between the pipe or tubing, and securing a perfectly-smooth joint within the coupling-collar, and preventing any friction of the fluid passing through the tubing on account of the irregularities at the coupling or joint.

What we claim as our invention, and desire to secure by Letters Patent, is—

1. In couplings for tubing, the combination, with tubing having one or more lugs or similar connecting devices at or near the end thereof, of the coupling-collar having annular calking-recesses at each end thereof, and one or more ribs extending diagonally across the calking-recesses to lock the lugs of the tubing within the collar and form a smooth and tight joint therein, substantially as described.

2. In couplings for tubing, the combination, with tubing having one or more lugs at or near the ends thereof, of the coupling-collar having an inner central ring or flange, annular calking-recesses on each side thereof, and ribs extending diagonally across the calking-recesses to lock the lugs of the tubing within the collar and press the ends of the tubing against the central ring, substantially as described.

GEO. RUSSELL.
ROBERT W. GORDON.

Witnesses:
A. C. JOHNSTON,
T. D. D. OURAND.